US011165859B1

(12) United States Patent
Eckman et al.

(10) Patent No.: US 11,165,859 B1
(45) Date of Patent: Nov. 2, 2021

(54) SCALING STATEFUL SERVICES HOSTED IN A CLUSTER OF SERVER NODES

(71) Applicant: Area 1 Security, Inc., Redwood City, CA (US)

(72) Inventors: Jeremy Eckman, Annapolis, MD (US); Michael Flester, Highland, MD (US); Eric Newton, Pikesville, MD (US)

(73) Assignee: Area 1 Security, Inc., Redwood City, CA (US)

( * ) Notice: Subject to any disclaimer, the term of this patent is extended or adjusted under 35 U.S.C. 154(b) by 0 days.

(21) Appl. No.: 17/227,197

(22) Filed: Apr. 9, 2021

(51) Int. Cl.
*H04L 29/08* (2006.01)

(52) U.S. Cl.
CPC ...... *H04L 67/1031* (2013.01); *H04L 67/1029* (2013.01)

(58) Field of Classification Search
CPC ............. H04L 41/0866; H04L 41/0869; H04L 41/0893; H04L 67/327; G06F 16/182; G06F 16/285; G06F 9/5083
See application file for complete search history.

(56) References Cited

U.S. PATENT DOCUMENTS

| | | | |
|---|---|---|---|
| 2017/0286517 A1* | 10/2017 | Horowitz | G06F 11/3006 |
| 2020/0252276 A1* | 8/2020 | Lairsey | G06T 19/006 |
| 2021/0281662 A1* | 9/2021 | Mathur | G06N 5/04 |

* cited by examiner

Primary Examiner — Hitesh Patel
(74) Attorney, Agent, or Firm — Baker Botts L.L.P.

(57) ABSTRACT

In an embodiment, the disclosed technologies implement scaling operations for clusters of server nodes hosting stateful services. An embodiment includes a cluster manager computer calling a first instance of scaling status functions for a first stateful service and a second instance of scaling status functions for a second stateful service, the first stateful service being programmed to implement a different service than the second stateful service. The cluster manager computer is programmed to implement different scaling operations for the first stateful service and the second stateful service, each set of the scaling operations being optimized for respective services.

17 Claims, 5 Drawing Sheets

SCALING STATEFUL SERVICES HOSTED IN A CLUSTER OF SERVER NODES

TECHNICAL FIELD

One technical field of the present disclosure is management of distributed computer systems having a cluster of server nodes that may expand or contract to accommodate changing load. Another technical field is computer-implemented processes and computer systems that are programmed to change the scale of server nodes hosting stateful data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As the technological capacity for organizations to create, track, and retain information continues to grow, a variety of different technologies for managing and storing the rising tide of information have been developed. Distributed storage systems, for example, provide clients with many different specialized or customized configurations of hardware and software to manage stored information in a highly durable and available way. Distributed computing systems also may be structured with sets or clusters of server computers or virtual machine instances, termed server nodes, programmed to provide services to requesting clients over networks or internetworks. Clusters of server nodes implementing the distributed storage systems or distributed computing systems may therefore be implemented as part of many different solutions for maintaining and managing information. Over time, utilization of a stateful cluster may change. For instance, the amount of data, workload, or access patterns to data may change, leaving current configurations less suited to the current utilization of the stateful cluster. Thus, the stateful cluster may be resized or scaled in order to provide a more optimal solution.

SUMMARY

The appended claims may serve as a summary of the invention.

DETAILED DESCRIPTION

Figure 1:
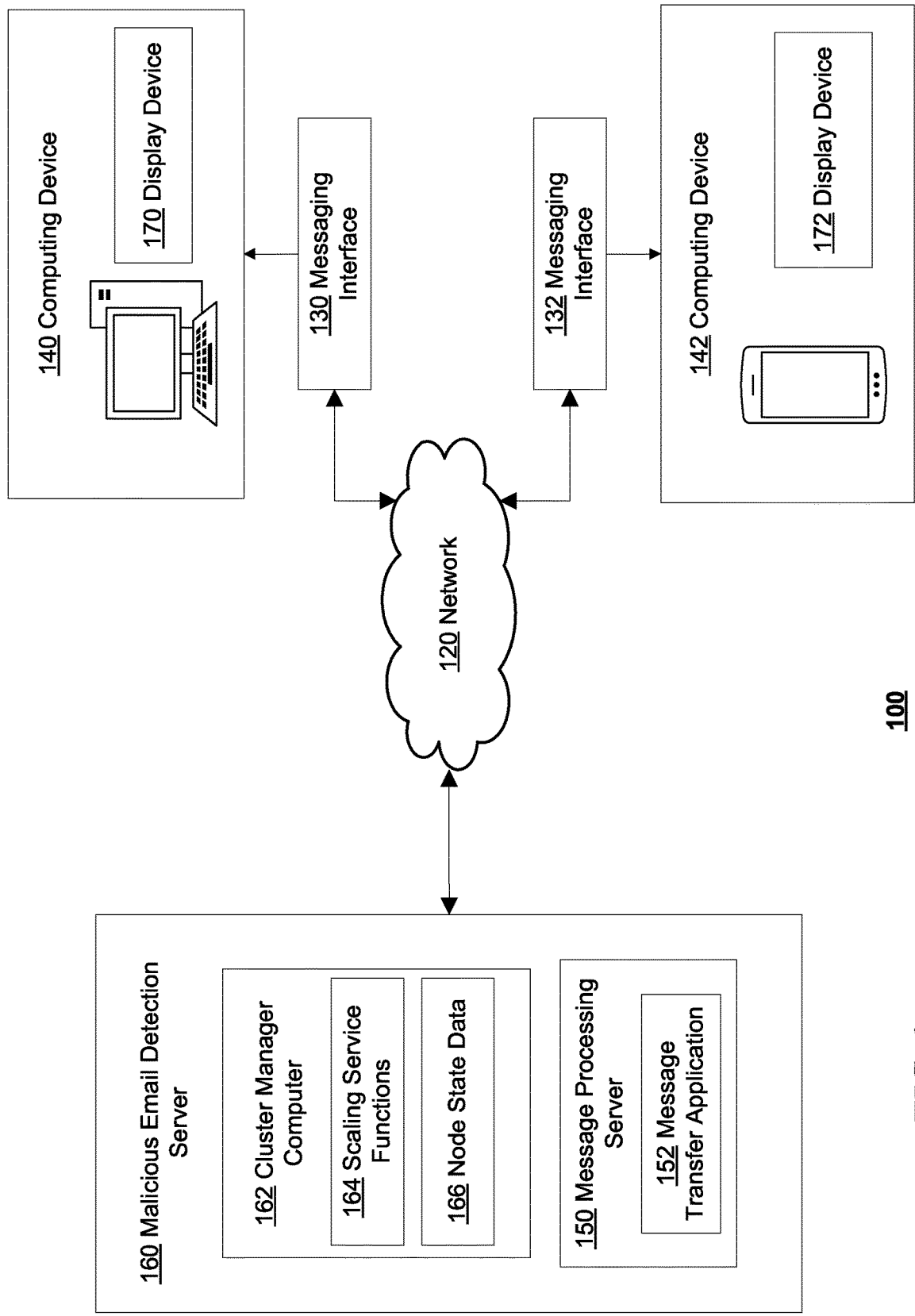
FIG. 1 is a block diagram that depicts an example networked computing system, in an embodiment.

This detailed description refers to the different drawings by specifying the numbers of the figures, and to the different parts by the use of reference numerals. While specific embodiments are described, the subject matter regarded as an invention is particularly pointed out by the appended claims and need not be limited by the details of the described embodiments. Embodiments are described herein in sections according to the following outline:

1. GENERAL OVERVIEW
2. STRUCTURAL OVERVIEW
   2.1 EXAMPLE COMPUTING SYSTEM
   2.2 EXAMPLE MESSAGING SYSTEM ARCHITECTURE
3. EXAMPLE OF AUTOMATIC SCALING OPERATIONS
4. IMPLEMENTATION EXAMPLE—HARDWARE OVERVIEW
5. EXTENSIONS AND ALTERNATIVES; BENEFITS AND IMPROVEMENTS

1. General Overview

Distributed systems provide flexible solutions for solving many different problems. Maintaining state, such as data for a database, a cache, an information store, or any other set of data for a system, program, application or client, in a distributed system may allow for diverse access or interaction with the state. Large data sets may, for instance, be divided into various segments of data so that work may be performed upon them in parallel, significantly reducing processing time. As the use of a stateful cluster changes, whether as a result of storing more or less data, performing different types of workloads, or changing network conditions or loads, the size or configuration of state among storage nodes may be rescaled to achieve a more optimal number of nodes.

Scaling a cluster that is actively interacting with other computers and servers may prove challenging, particularly if the cluster is hosting different stateful services. Different stateful services typically observe different load characteristics at various times, which means that the different stateful services may require scaling operations at different points in time. Thus, for a cluster of server nodes hosting different stateful services, server nodes hosting one particular stateful services may have different scaling needs than other server nodes of the cluster. For example, within a cluster of mail server nodes, server nodes hosting an email scanning service may need to be scaled more frequently and with a greater magnitude of scaling than server nodes hosting an attachment scanning service because mail servers typically process a far greater volume of email messages than attachments. Consequently, for a cluster of server nodes hosting different stateful services, there is a need for systems and methods for individually assessing the scaling needs of the different stateful services of the cluster and implementing the various scaling operations using one set of resources (e.g., server nodes of the cluster).

The disclosed technologies address the above and other technical problems and challenges. Embodiments are structured and programmed to dynamically implement scaling operations for clusters of server nodes hosting various stateful services. An embodiment includes a cluster manager computer calling a first instance of scaling status functions for a first stateful service and a second instance of scaling status functions for a second stateful service, the server nodes hosting the first stateful service being evaluated differently than the server nodes hosting the second stateful service. The cluster manager computer is also programmed to implement a set of scaling operations for the first stateful service that is different than a set of scaling operations implemented for the second stateful service.

While this disclosure describes the invention in the context of mail servers, including servers hosting email scanning and attachment scanning services, aspects of the disclosed technologies are not limited to mail servers and are equally useful to servers, generally. Similarly, while this disclosure describes the invention in the context of email messages, aspects of the disclosed technologies are not limited specifically to email messages and are equally applicable to any kind of digital electronic data and messages. In addition, embodiments of the disclosed technologies are not limited to malicious email detection and may be configured to detect other types of spoofing attacks.

2. Structural Overview

2.1 Example Computing System

FIG. 1 is a block diagram that depicts an example computing system that may be used to implement one embodiment. FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of scaling server nodes hosting stateful services. All embodiments of the claims are directed to stored program digital computers, and computer-executed operating methods, that act to admit or deny admission of specified kinds of digital electronic email messages to, toward, or through computer networks, firewalls, routers, switches, server computers, or end-user computing devices, using digital electronic means. The admission or blockage of a digital electronic email message in connection with networking gear using the means set forth herein is not capable of human performance. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, the computing system 100 is arranged and programmed to operate messaging interfaces 130, 132, message processing server 150, and malicious email detection server 160, in the transmission of electronic messages from upstream computers to downstream computers. Examples of upstream and downstream computers include sender computers from which electronic messages may originate and recipient computers that may receive electronic messages. For example, computing devices 140, 142 may operate as upstream and/or downstream computers via an electronic communications network 120. Malicious email detection server 160, computing devices 140, 142, and message processing server 150 are communicatively coupled to the electronic communications network 120 via for example wired, wireless, and/or optical connections. Display devices 170, 172 are communicatively coupled to computing devices 140, 142, respectively.

Implemented in the computing devices and servers 140, 142, 150, 160 using computer software, hardware, or software and hardware, are processor-executable instructions, data structures, and digital data, stored in memory, which cooperate to provide the computer-implemented functionality described herein. For purposes of illustrating a clear example, these computer-implemented components are represented schematically in the figures that follow, which are described in detail below.

"System" as used herein may refer to a single computer or network of computers and/or other devices. "Computer" or "computing device" as used herein may refer to a computer or any other electronic device that is equipped with a processor. "Processor" as used herein may refer to a software or hardware processor. "Instructions" or "application" as used herein may refer to one or more sets of computer program instructions; in all cases, elements of instructions are capable of computer execution or evaluation to generate output based upon a computer transformation of an input dataset into different digitally stored, electronic data.

"Model" as used herein may refer to one or more sets of computer program instructions and datasets that collectively define representations data, relationships between data or rules or transformations of other data. For example, a model is capable of computer execution or evaluation to generate output that indicates a probabilistic or statistical likelihood that an input or a set of inputs is associated with a particular class, category, type or other characterization.

Although computing system 100 may be implemented with any number of the described components, in this disclosure, these elements may be referred to in the singular form for ease of discussion. Also, while the described computer components are shown as separate elements in the drawings, the illustrations are not meant to imply that separation of these elements is required. The illustrated components may be divided over any number of physical systems or may be contained in a single physical computer system and can communicate with each other in any appropriate manner.

In an embodiment, each of computing devices 140, 142 is a client-side computing device or set of cooperating computing devices, such as a smart phone, tablet computer, wearable or body-mounted device, smart appliance, laptop machine, or combination of any of such devices. In an embodiment, servers 150, 160 are each a server-side computing device such as a server computer or a cluster or network of server computers accessible by the Internet, for example in a public or private cloud. In some embodiments, servers 150, 160 are the same group of computers or are part of the same computer system. As illustrated in FIG. 1, each of display devices 170, 172 is implemented as part of a computing device 140, 142, respectively, but may be implemented as a separate device or as part of another device, or as multiple networked display devices, in other implementations. Portions of processing described as performed by server 150 or server 160 may, in some embodiments, be performed by one or more of computing devices 140, 142.

Messaging interfaces 130, 132 are each client-side messaging software such as a mail client or a messaging application, which reside in memory of computing devices 140, 142, respectively. Malware attacks and other security risks can occur during the transmission of messages or during the download of electronic content from the Internet. Thus, in some embodiments, a message may refer to an electronic file that is downloaded from network 120 to computing devices 140, 142 via messaging interfaces 130, 132. As such, messaging interfaces 130, 132 may be implemented as any type of client-side software applications that are configured to display visual content, such as web browsers, search engines, web-based applications, social media applications. Portions of messaging interfaces 130, 132 may be hosted by a hosting computer (not shown) on the network 120.

Figure 4:
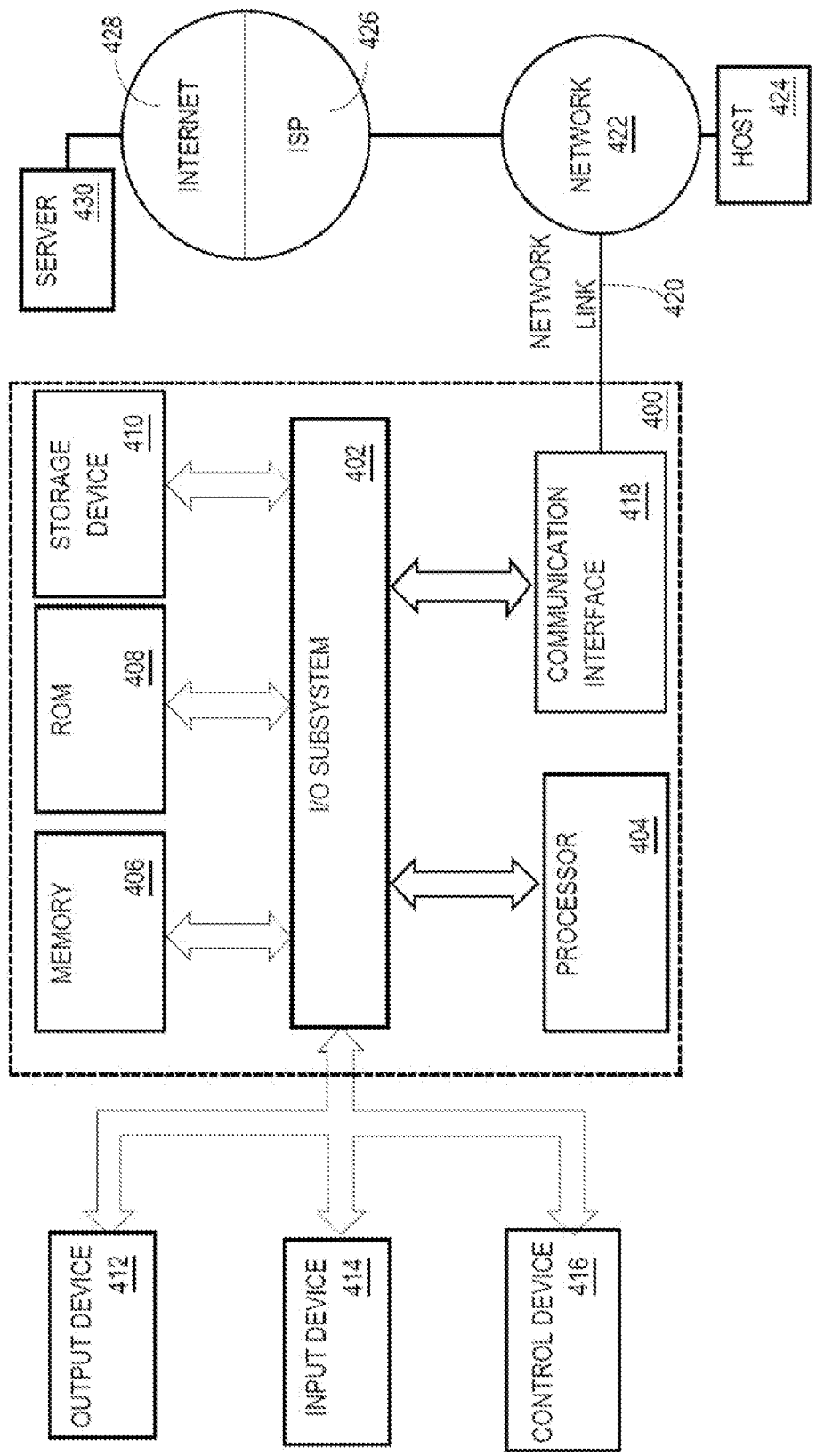
FIG. 4 is a block diagram that illustrates a computer system upon which an embodiment of the present invention may be implemented.

Messaging interfaces 150, 152 cooperate with display devices 170, 172, respectively, to provide graphical user interfaces through which electronic messages can be received, displayed, read, managed, composed, and sent, via human interaction with input and output device(s) of computing devices 140, 142. Examples of input and output device(s) and other components of computing devices and servers 140, 142, 150, 160 are shown in FIG. 4, described below.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing devices and servers 140, 142, 150, 160.

Message processing server 150 is programmed to operate message transfer application 152. Message transfer application 152 when executed by a processor is programmed to control the transmission of electronic communications between upstream computers and downstream computers, such as computing devices 140, 142, on network 120. Portions of message transfer application 152 may be implemented as or in combination with a text messaging service such as SMS (Short Message Service) or MMS (Multimedia Messaging Service), or as a Voice over Internet (VOIP) server or as a mail server of a public or private electronic mail or messaging system. Portions of message transfer application may be implemented in an online service, such as a social network service, in which electronic messages may include notifications, recommendations, shares, comments, news feeds, tweets, and/or connection requests. Message transfer application 152 may include various message scanning and filtering technologies, such as virus scanners, intrusion detection systems, and/or spam filters.

In an embodiment, message transfer application 152 is programmed to use stateless security scanning to scan messages as they are in transit from an upstream computer to one or more downstream computers. When the message scanner detects an incoming message, the message is processed by malicious email detection server 160.

After a message is processed by malicious email detection server 160, message transfer application 152 is programmed to receive output from malicious email detection server 160 and determines, based on the output, how to further process the message. For example, message transfer application 152 may be programmed to determine to modify, delay, re-route, or block the message, or forward the message to a next-hop router or other downstream computer or element of network infrastructure gear.

In an embodiment, message transfer application 152 is programmed to execute a rule or set of rules to map the output of malicious email detection server 160 to an appropriate network instruction using, for example, a mapping table or heuristics, and then causes the network instruction that corresponds to the output to be implemented on network 120. Implementation can be performed by a network device such as a mail server or a router executing the network instruction to drop the message, transmit configuration data to a firewall or router, reroute the message to a different machine, or allow the message to proceed to its intended destination.

The network instruction output by message transfer application 152 in response to output produced by malicious email detection server 160 can include a network command to modify, delay, block, -re-route or forward a message to downstream routers, message transfer agents or other network nodes. An instruction to modify a message may include an instruction to add a notification flag to the message before sending the message downstream; for example, a "SUSPECTED PHISHING" notification added to the subject line of the message, or to re-direct or quarantine the message containing the link, for example by routing the message to a honeynet or quarantine services.

Malicious email detection server 160 is programmed to determine whether messages scanned by message processing server 150 are malicious email compromise attack messages and provide output to message processing server 150. For example, if malicious email detection server determines that a particular message is a malicious message, malicious email detection server is programmed to provide output to message processing server 150 indicating that the particular message is a malicious message. To make such determinations, Malicious email detection server 160 operates a cluster manager computer 162 to utilize a distributed storage system—such as distributed cloud databases and file hosting services—that are hosting stateful services, for example, for email processing.

Maintaining state, such as data for a database, a cache, an information store, or any other set of data for a system, program, application or client, in a distributed system may allow for diverse access or interaction with the state. Large data sets may, for instance, be divided into various segments of data so that work may be performed upon them in parallel, significantly reducing processing time. As the use of a stateful cluster changes, whether as a result of storing more or less data, performing different types of workloads, or changing network conditions or loads, the size or configuration of state among storage nodes may be rescaled to achieve a more optimal number of nodes.

Cluster manager computer 162 is programmed to monitor and coordinate the additional and removal of server nodes with each stateful service residing in a cluster of server nodes, such as those relating to email scanning and attachment scanning/detection. Cluster manager computer 162 executes scaling service functions 164 to determine whether any scaling actions are needed for a particular stateful service within a cluster. If scaling operations are need, the cluster manager computer 162 maps the server nodes that will be involved with the stateful data transfers based in part on node state data 166, which indicates server nodes that are active and inactive in hosting stateful services. Then, the cluster manager computer 162 facilitates the stateful transfers between the nodes.

In one embodiment, scaling service functions 164 comprise sets of executable instructions that have been programmed to execute, when called, the functions that are further described in other sections herein. For example, scaling service functions 164 may have symbolic names that are programmatically callable from other program code and form part of a published application programming interface (API). In an embodiment, the call format in the API may be fixed across different services, but internal implementations of each function may vary from service to service. Examples of particular technologies that may be used to implement processes and flows performed by cluster manager computer 162 are described in greater detail below with reference to FIG. 3A and FIG. 3B. The processes shown in FIG. 3A and FIG. 3B and described below are not limited to scaling of stateful services. Portions of the processes shown in FIG. 3A and FIG. 3B may be used to perform scaling operations involving non-stateful services.

2.2 Example Messaging System Architecture

Figure 2:
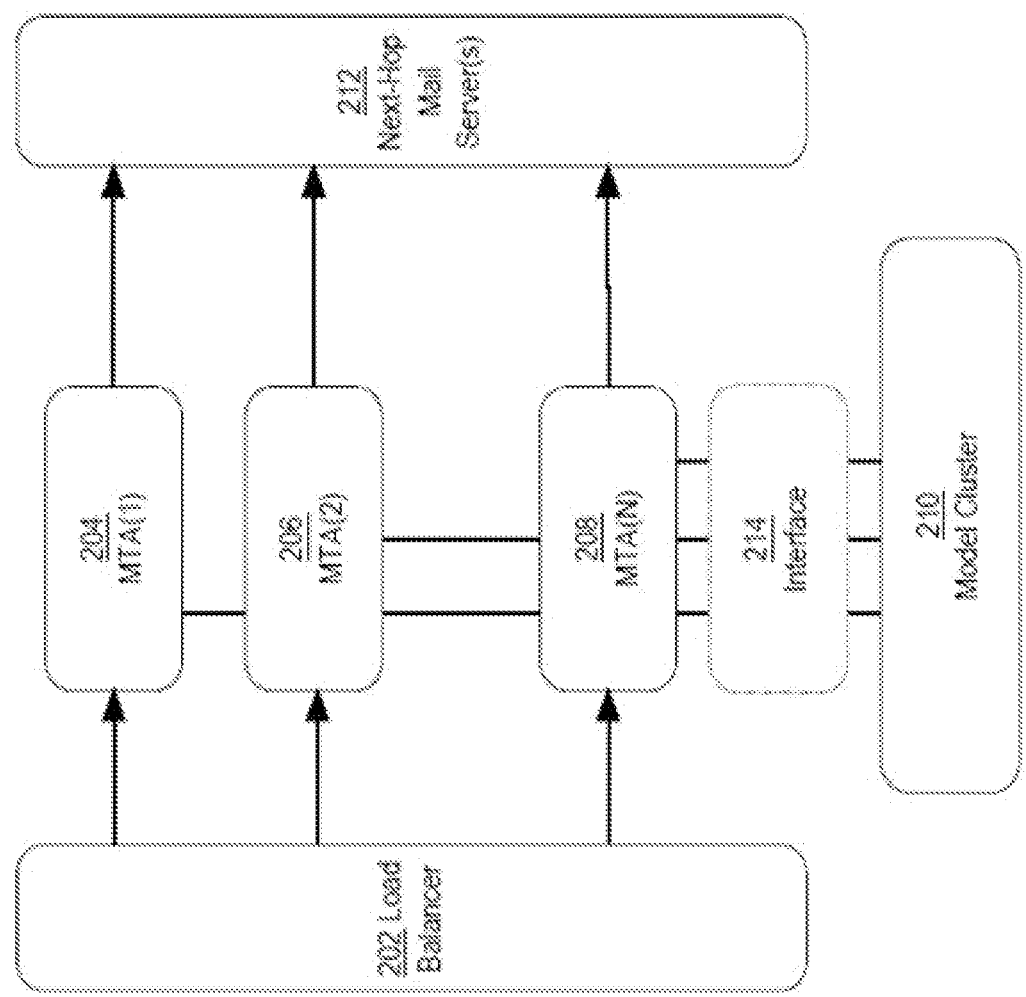
FIG. 2 is a schematic depiction of a portion of the computing system of FIG. 1, in an embodiment.

FIG. 2 illustrates an embodiment of a system architecture in which aspects of the disclosed technologies may be implemented. A network 200 includes network devices 202, 212. Network device 202 is illustratively a load balancer while network device 212 is a next-hop server such as a mail server. Network 200 may be a portion of network 120, described above.

Any number N of message transfer applications (also called agents) (MTAs) 204, 206, 208 are interposed between network devices 202, 212. Thus, electronic messages that are in transit from network device 202 to network device 212 are processed by one or more of MTAs 204, 206, 208 prior to delivery to network device 212. A message scanning application operated by an MTA 204, 206, 208 is programmed to perform stateless security scanning of messages received from network device 202 and prior to transmission of the messages to network device 212.

In an embodiment, interface 214 is interposed between the MTAs 204, 206, 208 and a model cluster 210. However, portions of interface 214 may be implemented within an MTA 204, 206, 208. An example of interface 214 is an application program interface (API).

Model cluster 210 may be implemented in main memory, disk storage, or other digital electronic storage on message processing server 150 and/or malicious email detection server 160 and may include one or more machine learning-based model(s) that may be selectively engaged and disengaged by interface 214 for use in connection with the stateless scanning performed by the MTAs 204, 206, 208. In an embodiment, model cluster 210 is programmed with machine learning-based model(s) used by MTAs 204, 206, 208 for many different types of message classification, including classification as spam, classification as legitimate message, classification as phishing, spoofing, or malicious, and classification according to characteristics of the message text, such as any one or more of the message text characteristics described herein. In an embodiment, message processing server 150 that is used to host model cluster 210 may be comprised of stateless model computers and servers.

Models in model cluster 210 are programmed using, for example, one or more text-based classification modeling approaches, such as logistic regression, random forests, gradient-boosted trees, neural networks, and deep neural networks. For instance, model cluster 210 may include models created using different modeling approaches, or may include models all created using the same modeling approach but with different training data.

Interface 214, when executed by a processor, is programmed to control the selective engagement of malicious email detection server 160 by message processing server 150 in tasks performed by, or requested by, message transfer application 152. The programming of interface 214 manages and facilitates electronic communications of data and instructions between message processing server 150 and malicious email detection server 160 during the handling by message transfer application 152 of electronic messages and their respective attachments, for example messages that are being transmitted from computing device 140 to computing device 142, or from computing device 142 to computing device 140, over network 120. Interface 214 is shown as a separate component in FIG. 2 but all or portions of interface 214 may be implemented as part of message transfer application 152. Alternatively, or in addition, some portions of interface 214 may be implemented on malicious email detection server 160.

2.3 Example of Distributed Database System Architecture

Figure 3A:
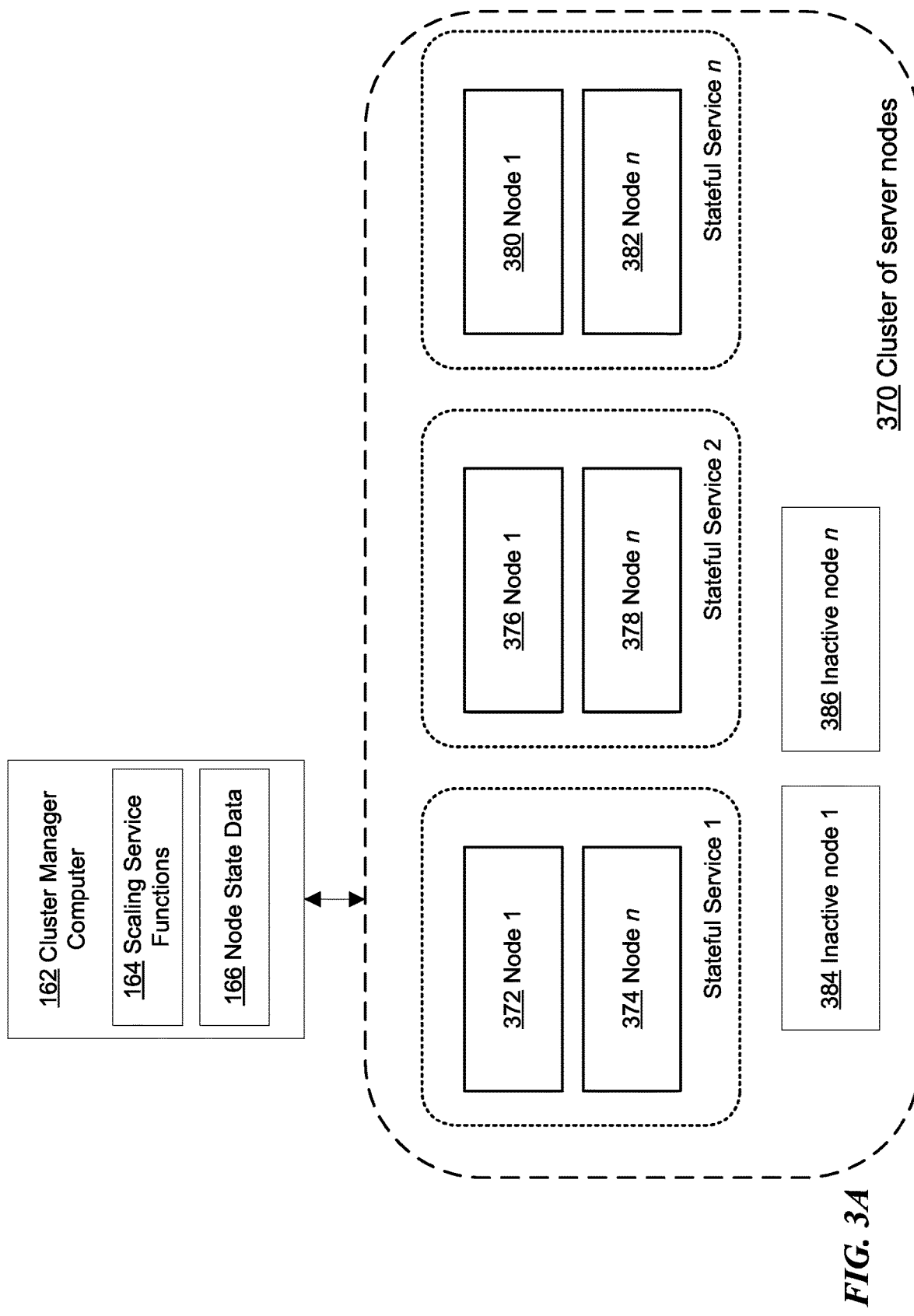
FIG. 3A is a schematic depiction of another portion of the computing system of FIG. 1, in an embodiment.

FIG. 3A illustrates a system architecture of a distributed email processing system used to host one or more stateful services on, for example, mail servers. The system architecture is not intended to illustrate every portion of the architecture but are provided at a high-level of illustration that is normally used by a person of ordinary skill in of art to communicate the scaling operations performed by the cluster manager computer 162.

As illustrated in FIG. 3A, cluster manager computer 162 is communicatively coupled to a cluster of server nodes 370 hosting various stateful services. These stateful services are also communicatively coupled to malicious email detection server 160 to provide access to the data stored within the various nodes of the stateful services.

In an embodiment, the cluster manager computer 162 is programmed to execute scaling service functions 164 to implement scaling operations to the various stateful services within cluster 370. Cluster 370 includes a plurality of server nodes hosting various stateful services. Examples of stateful services that the cluster manager computer 162 manages include email scanning service, attachment scanning/detecting service, and machine learning model service. In an embodiment, one or more server nodes hosting the machine learning model service is programmed to executing machine learning algorithms on various digital electronic messages, for example, for the content included in such messages to extract message characteristics or to classify the type of content. In an embodiment, the cluster manager computer 162 may evaluate the scaling needs of each of the stateful services within the cluster 370 based on different evaluation metrics and implement different sets of scaling service functions 164.

In an embodiment, the cluster manager computer 162 is programmed to maintain node state data 166 indicating the identification of nodes that are hosting stateful services and identification of inactive nodes that are available for scaling operations. In an embodiment, for each of the server nodes, the node state data 166 is stored within the node itself.

3. Example of Automatic Scaling Operations

Figure 3B:
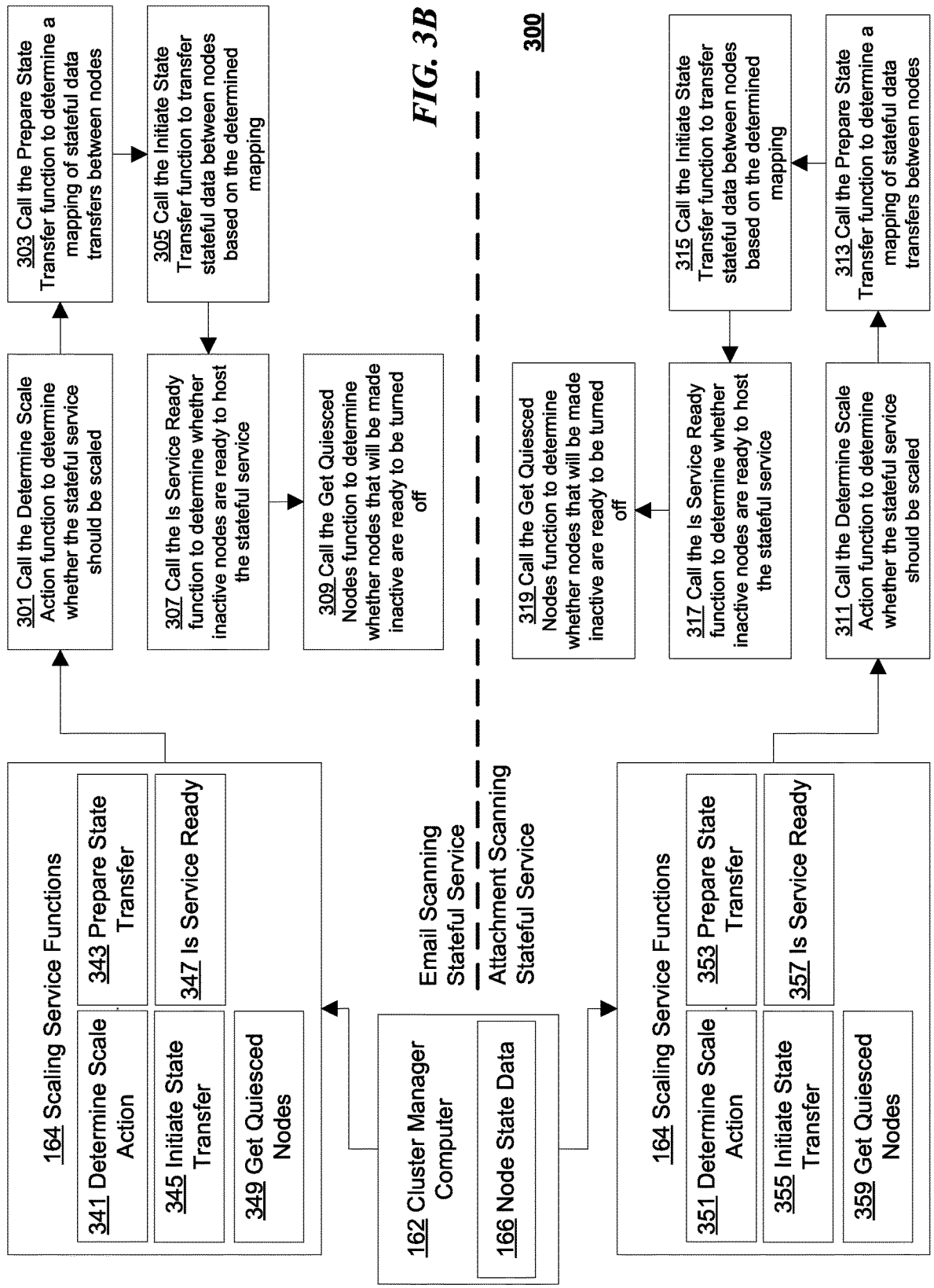
FIG. 3B is a diagram that depicts a process, in an embodiment.

FIG. 3B illustrates a flow diagram 300 that illustrates operations performed by a cluster manger computer 162 to implement scaling functions 164 for two different stateful services. While only two stateful services are illustrated in FIG. 3B, the cluster manager computer 162 is capable of managing additional stateful services based on substantially the same processes and operations described herein.

In an embodiment, the cluster manager computer 162 implements different scaling service functions 164 to different stateful services to evaluate each of the stateful services based on an evaluation metric that is suitable for that stateful service and to implement scaling operations that are tailored to the needs of that stateful service. Typically, to determine whether the server nodes hosting a particular stateful service requires a scaling operation, the server nodes' CPU, memory, and/or storage utilizations are evaluated. In such cases, for example, the cluster manager computer 162 may determine to scale up the stateful service if the server nodes' utilization of CPU, memory, and/or storage are at, or near, maximum utilization. However, for server nodes hosting email scanning service, their load may not be accurately reflected by CPU, memory, and/or storage utilization due to the unpredictable and heterogenous nature of the message size and characteristics. Thus, in an embodiment, server nodes hosting an email scanning service are evaluated using a unique, customized evaluation metric based on the load characteristics experienced by the email scanning service. For example, server nodes hosting an email service may be evaluated based on depth of message queue. Given that these server nodes are typically processing large volume of email messages having unpredictable and varying sizes and characteristics, the memory impact of processing each message may be more accurately depicted when it is evaluated at near-maximum bound size. And, when the memory impact of processing each message is evaluated at near-maximum bound size, load on the servers directly correlates to depth of message queue. Thus, the load on server nodes hosting email scanning service can be evaluated based on depth of message queue rather than CPU, memory, and/or storage utilization.

The top half of FIG. 3B is illustrated to show the cluster manager computer 162 implementing, programmatically, a set of scaling service functions 164 intended for an email scanning service.

At block 301, the cluster manager computer 162 is programmed to call the Determine Scale Action function to determine if any scaling actions are needed for the email scanning service. As input to the function, the cluster manager computer 162 may provide a list of nodes that are active within the cluster. Once called, in an embodiment, the Determine Scale Action function makes API calls to each of the server nodes hosting the email scanning service and requests the server node to respond with its then-current processing capacity measured by a number of email messages in a queue of email messages. Then, to determine whether any scaling action is warranted, the Determine Scale Action function evaluates whether the number of messages in the queue satisfies either a maximum threshold or a minimum threshold. If the number of emails in the queue exceeds a maximum threshold, the Determine Scale Action function returns to the cluster manager computer 162 data indicating that scale-up operations are needed. If the number of emails in the queue is lower than a minimum threshold, the Determine Scale Action function returns to the cluster manager computer 162 data indicating that scale-down operations are needed. If the number of emails in the queue does not satisfy any threshold, the Determine Scale Action function returns to the cluster manager computer 162 data indicating that no scaling action is necessary. In some embodiment, determination of the scaling action may be evaluated on a collective basis of all of the server nodes hosting the email scanning service, e.g., the collective email queue depth of all the server nodes. In other embodiments, email queue depth of the server nodes may be evaluated on an individual basis, and a scaling action may be determined as being needed if the email queues of a sufficient number of server nodes satisfy a threshold.

In an embodiment, the maximum and/or minimum thresholds for each of the server nodes hosting an email scanning service is programmatically determined based on the number of email messages that the server node is capable of processing concurrently before its computational performance begins to suffer. For example, a server node hosting an email scanning service may be configured to process concurrently up to fifty to hundred (50-100) email message because concurrent processing of additional email messages reduces the server node's performance. In such a case, the thresholds for the server node may be configured at based on factors of the 100 email limitation, e.g., maximum threshold of 200 emails based on factor of 2 and minimum threshold of email messages at a factor of half. In an embodiment, the concurrent email processing limitation of each server node may be determined based on computer-implemented experimentations or based on historical performance data of the server nodes.

In some embodiments, the Determine Scale Action function returns to the cluster manager computer 162 data indicating a scaling action is necessary based on predictions or patterns derived from historical load characteristics information to allow the cluster of server nodes to be better equipped to handle the predicted load before to actually experiencing it. In other embodiments, the Determine Scale Action function returns to the cluster manager computer 162 data indicating a scaling action is necessary based on a diurnal pattern of the load characteristics regardless of the email queue depth or CPU, memory, and/or storage utilization. The load on the server nodes hosting an email scanning service typically follow a diurnal pattern. For example, the system load (e.g., email volume) is typically low in the late evenings and early mornings and high in the late mornings and early afternoons. In an embodiment, the Determine Scale Action function is programmed to leverage the diurnal patterns observed in the load characteristics by recommending scaling actions in anticipation of increases or decreases of load. This allows the cluster of server nodes to be better equipped to handle the predicted load before to actually experiencing it.

If a scaling action is necessary, the Determine Scale Action function determines the step-size of the scaling action, which is a metric that indicates how much the stateful service should be scaled by. For example, if scaling up, the step-size indicates how many additional inactive server nodes are to be incorporated into a list of active nodes hosting the email scanning service, per each scaling action. Alternatively, if scaling down, the step-size indicates how many active server nodes are to be turned inactive, per each scaling action.

If the Determine Scale Action function recommends a scaling action, at block 303, the cluster manager computer 162 is programmed to call the Prepare State Transfer function to determine a mapping of stateful data transfers between the server nodes. In an embodiment, the Prepare State Transfer function receives two lists of nodes from the cluster manager, one list comprising originating nodes that will have stateful data transferred away from and another list comprising destination nodes that the stateful data will be transferred into. The Prepare State Transfer function also provides a mapping that indicates exactly where the stateful data from each of the originating nodes will end up in. For example, if the server nodes are to be scaled-up, the Prepare State Transfer function provides a mapping of stateful data transfers from active nodes (e.g., originating nodes) to inactive nodes (e.g., destination nodes). In scale-up operations, data may also be transferred from active nodes to active nodes, for example, to rearrange or redistribute data across the server nodes. If the server nodes are to be scaled-up, the Prepare State Transfer function provides a mapping of stateful data transfers from active nodes (e.g., originating nodes) to other active nodes (e.g., destination nodes) to allow the originating nodes to be turned off. The scale-up operations may also involve rearrangement or redistribution of the data among the server nodes.

At block 305, the cluster manager computer 162 is programmed to call the Initiate State Transfer function to transfer stateful data between server nodes that were mapped by the Prepare State Transfer function. In an embodiment, the cluster manager computer 162 provides the mapping information that it received from the Prepare State Transfer function to the Initiate State Transfer function. Then, based on the mapping information, the Initiate State Transfer function transmits instructions to the originating nodes to initiate the stateful data transfers.

If the scaling action relates to scale-up operations, at block 307, the cluster manager computer 162 is programmed to call the Is Service Ready function to determine whether the inactive server nodes with the recently transferred stateful data are ready to host the email scanning service. In an embodiment, the cluster manager computer 162 provides node identifiers of the inactive nodes with the recently transferred stateful data to the Is Service Ready function. Then, the Is Service Ready function verifies whether the inactive nodes have been initialized, which may include determining whether the stateful data has successfully transferred into the inactive nodes. If the Is Service Ready function returns to the cluster manager computer 162 that the inactive nodes have successfully initialized, the cluster manager computer 162 instructs a load balancer of the cluster 370 include those nodes as part of the active nodes of the cluster and subsequently direct any applicable access requests to those nodes.

At block 309, if any of the server nodes are to be turned off, for example, in response to scale-down operations or redistribution of data, the cluster manager computer 162 is programmed to call the Get Quiesced Nodes function to determine whether nodes that will be made inactive are ready to be turned off. In an embodiment, the cluster manager computer 162 provides a list of active nodes to the Get Quiesced Nodes function. In response, the Get Quiesced Nodes function determines whether any of the nodes in the list are to be turned off, and if so, whether clean up activities have been performed on those nodes, which may include verifying whether the applicable stateful data has been transferred to the appropriate destination nodes. In an embodiment, for each server node hosting an email scanning service that is to be turned off, the Get Quiesced Nodes function evaluates whether the depth of message queue of the server node is at zero before determining that the server node is ready to be turned off.

The bottom half of FIG. 3B is illustrated to show the cluster manager computer 162 implementing, programmatically, a set of scaling service functions 164 intended for an attachment scanning stateful service. The operations illustrated in the bottom half of FIG. 3B are also applicable to stateful services, generally, and are not limited to the attachment scanning service.

At block 311, the cluster manager computer 162 is programmed to call the Determine Scale Action function to determine if any scaling actions are needed for the attachment scanning service. As input to the function, the cluster manager computer 162 may provide to the function a list of nodes that are active within the cluster. Once called, in an embodiment, the Determine Scale Action function makes API calls to each of the server nodes hosting the attachment scanning service and requests the server node to respond with its then-current processing capacity measured by utilizations of CPU, memory, or storage, or a combination of any of the such (referred herein as "processing utilization"). Then, to determine whether any scaling action is warranted, the Determine Scale Action function evaluates whether the processing utilization satisfies either a maximum threshold or a minimum threshold. If the processing utilization is near, or at, a maximum threshold, the Determine Scale Action function returns to the cluster manager computer 162 data indicating that scale-up operations are needed. If the processing utilization is near, or at, a minimum threshold, the Determine Scale Action function returns to the cluster manager computer 162 data indicating that scale-down operations are needed. If the processing utilization does not satisfy any threshold, the Determine Scale Action function returns to the cluster manager computer 162 data indicating that no scaling action is necessary. In some embodiment, determination of the scaling action may be evaluated on a collective basis of all of the server nodes hosting the attachment scanning, e.g., the collective processing utilization of all the server nodes. In other embodiments, processing utilization of the server nodes may be evaluated on an individual basis, and a scaling action may be determined as being needed if the processing utilization of a sufficient number of server nodes satisfies a threshold.

In an embodiment, the maximum and/or minimum thresholds for each of the server nodes hosting the attachment scanning service is programmatically determined based on the hardware limitations of the server node.

In some embodiments, the Determine Scale Action function returns to the cluster manager computer 162 data indicating a scaling action is necessary based on a diurnal pattern of the load characteristics regardless of the processing utilization. The load on the server nodes hosting an attachment scanning service typically follow a diurnal pattern. For example, the system load is typically low in the late evenings and early mornings and high in the late mornings and early afternoons. In an embodiment, the Determine Scale Action function is programmed to leverage the diurnal patterns observed in the load characteristics by recommending scaling actions in anticipation of increases or decreases of load. This allows the cluster of server nodes to be better equipped to handle the predicted load before to actually experiencing it.

In an embodiment, the step-size for an attachment scanning service is reduced in comparison to the step-size for an email scanning service because server nodes hosting the attachment scanning service typically experience slower load increases and decreases.

The operations illustrated at block 313 are substantially similar to the operations illustrated at block 303 except that the operations are applied to an attachment scanning service.

The operations illustrated at block 315 are substantially similar to the operations illustrated at block 305 except that the operations are applied to an attachment scanning service.

The operations illustrated at block 317 are substantially similar to the operations illustrated at block 307 except that the operations are applied to an attachment scanning service.

The operations illustrated at block 319 are substantially similar to the operations illustrated at block 309 except that the operations are applied to an attachment scanning service. In an embodiment, for each server node hosting an attachment scanning service that is to be turned off, the Get Quiesced Nodes function evaluates whether CPU, memory, and/or storage utilization is below a minimum threshold before determining that the server node is ready to be turned off.

4. Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

For example, FIG. 4 is a block diagram that illustrates a computer system 400 upon which an embodiment of the present invention may be implemented. Components of the computer system 400, including instructions for implementing the disclosed technologies in hardware, software, or a combination of hardware and software, are represented schematically in the drawings, for example as boxes and circles.

Computer system 400 includes an input/output (I/O) subsystem 402 which may include a bus and/or other communication mechanism(s) for communicating information and/or instructions between the components of the computer system 400 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 404 are coupled with I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor.

Computer system 400 also includes a memory 406 such as a main memory, which is coupled to I/O subsystem 402 for storing information and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, render computer system 400 into a special-purpose machine that is customized to perform the operations specified in the instructions.

Computer system 400 further includes a non-volatile memory such as read only memory (ROM) 408 or other static storage device coupled to I/O subsystem 402 for storing static information and instructions for processor 404. The ROM 408 may include various forms of programmable ROM (PROM) such as erasable PROM (EPROM) or electrically erasable PROM (EEPROM). A persistent storage device 410 may include various forms of non-volatile RAM (NVRAM), such as flash memory, or solid-state storage, magnetic disk or optical disk, and may be coupled to I/O subsystem 402 for storing information and instructions.

Computer system 400 may be coupled via I/O subsystem 402 to one or more output devices 412 such as a display device. Display 412 may be embodied as, for example, a touch screen display or a light-emitting diode (LED) display or a liquid crystal display (LCD) for displaying information, such as to a computer user. Computer system 400 may include other type(s) of output devices, such as speakers, LED indicators and haptic devices, alternatively or in addition to a display device.

One or more input devices 414 is coupled to I/O subsystem 402 for communicating signals, information and command selections to processor 404. Types of input devices 414 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be implemented as a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

Computer system 400 may implement the techniques described herein using customized hard-wired logic, one or more ASICs or FPGAs, firmware and/or program logic which in combination with the computer system causes or programs computer system 400 to operate as a special-purpose machine. According to one embodiment, the techniques herein are performed by computer system 400 in response to processor 404 executing one or more sequences of one or more instructions contained in memory 406. Such instructions may be read into memory 406 from another storage medium, such as storage device 410. Execution of the sequences of instructions contained in memory 406 causes processor 404 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage device 410 either before or after execution by processor 404.

Computer system 400 also includes a communication interface 418 coupled to bus 402. Communication interface 418 provides a two-way data communication coupling to network link(s) 420 that are directly or indirectly connected to one or more communication networks, such as a local network 422 or a public or private cloud on the Internet. For example, communication interface 418 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 418 may include a local area network (LAN) card to provide a data communication connection to a compatible LAN. Wireless links may also be implemented. In any such implementation, communication interface 418 sends and receives electrical, electromagnetic or optical signals over signal paths that carry digital data streams representing various types of information.

Network link 420 typically provides electrical, electromagnetic, or optical data communication directly or through one or more networks to other data devices, using, for example, cellular, Wi-Fi, or BLUETOOTH technology. For example, network link 420 may provide a connection through a local network 422 to a host computer 424 or to other computing devices, such as personal computing devices or Internet of Things (IoT) devices and/or data equipment operated by an Internet Service Provider (ISP) 426. ISP 426 provides data communication services through the world-wide packet data communication network commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution.

5. Extensions and Alternatives; Benefits and Improvements

Embodiments provide scaling operations for clusters of server nodes hosting various stateful services, in particular mail-related services, that otherwise have escaped detection with prior technology. Consequently, clusters of server nodes will be able to increase their processing throughput by scaling up (e.g., increasing computation capabilities) when experiencing increase in load and further be able to use fewer resources by scaling down when experiencing decrease in load.

The disclosure to this point has explained a cluster manager computer that is programmed to implement automatic scaling operations for a cluster hosting various stateful services, such as an email scanning service and an attachment scanning service. In one aspect, the cluster manager computer uses a novel approach of applying different evaluation metrics to server nodes hosting the email scanning service and server nodes hosting the attachment scanning service. For example, the disclosure discusses evaluating the utilization of the server nodes hosting the email scanning service based on a number of email messages in a queue. The cluster manager computer is programmed to implement different scaling operations for the different stateful services, such as the step-size of the scaling operation. The cluster manager computer is further programmed to implement scaling operations based on predicted load characteristics of the server nodes determined based on a diurnal pattern. Implementing scaling operations based on predicted load characteristics allows the stateful service to be scaled preemptive to the anticipated increase or decrease of load.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps. Throughout this disclosure, an element that is identified by a noun followed by the letter s in parentheses, as in (s), indicates that one or more of the element may be used in various embodiments.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method, comprising:
    using a cluster manager computer that is communicatively coupled to a plurality of server nodes, each of the server nodes being configured to host one of a plurality of different stateful services, the cluster manager computer being programmed to invoke scaling operations of the server nodes in real-time as the server nodes operate, each of the different stateful services being programmed to implement a different instance of a plurality of scaling service functions:
    calling a first instance of a scaling status function among the plurality of scaling service functions of a first stateful service and receiving a first scaling action indicating a change in scaling for one or more of the plurality of server nodes hosting the first stateful service, the first scaling action being determined based on first capacity data indicating a then-current processing capacity and a threshold processing capacity of the one or more server nodes hosting the first stateful service;
    calling a second instance of a scaling status function among the plurality of scaling service functions of a second stateful service and receiving a second scaling action indicating a change in scaling for one or more of the plurality of server nodes hosting the second stateful service, the second scaling action being determined based on second capacity data indicating a then-current processing capacity and a threshold processing capacity of the one or more server nodes hosting the second stateful service, the second instance of the state transfer function having a different implementation in computer program code than the first instance of the state transfer function;
    based on the first scaling action, calling a first instance of a state transfer function among the plurality of scaling service functions of the first stateful service for transfer of stateful data between two or more of the plurality of server nodes;
    based on the second scaling action, calling a second instance of a state transfer function among the plurality of scaling service functions of the second stateful service for transfer of stateful data between two or more of the plurality of server nodes.

2. The method of claim 1, a unit of measurement associated with the first capacity data being different from a unit of measurement associated with the second capacity data.

3. The method of claim 1, further comprising, based on the first scaling action:
    calling a state transfer preparation function among the plurality of scaling service functions of the first stateful service;
    receiving, in response to calling the state transfer preparation function: a first identification of first server nodes of the plurality of server nodes to transfer stateful data from; a second identification of second server nodes of the plurality of server nodes to transfer the stateful data into; a mapping of the first server nodes to the second server nodes;
    providing the mapping when calling the first instance of the state transfer function among the plurality of scaling service functions of the first stateful service.

4. The method of claim 1, further comprising, based on the second scaling action:
    calling a state transfer preparation function among the plurality of scaling service functions of the second stateful service;
    receiving, in response to calling the state transfer preparation function: a first identification of first server nodes of the plurality of server nodes to transfer stateful data from; a second identification of second server nodes of the plurality of server nodes to transfer the stateful data into; a mapping of the first server nodes to the second server nodes;
    providing the mapping when calling the second instance of the state transfer function among the plurality of scaling service functions of the second stateful service.

5. The method of claim 1, the change in scaling comprising any of scale-up operations or scale-down operations.

6. The method of claim 1, the first stateful service being programmed to scan digital electronic messages.

7. The method of claim 6, a unit of measurement associated with the first capacity data being based on a number of digital electronic messages and, for the one or more server nodes hosting the first stateful service, the then-current processing capacity specifying a number of digital electronic messages stored within a queue and the threshold processing capacity specifying on a threshold number of digital electronic messages for the queue.

8. The method of claim 7, the threshold number of digital electronic messages for the queue being either a maximum criteria or a minimum criteria, the first scaling action being determined when the then-current processing capacity satisfies either the maximum criteria or the minimum criteria.

9. The method of claim 1, the second stateful service being programmed to scan attachments associated with digital electronic messages.

10. The method of claim 9, a unit of measurement associated with the second capacity data being based on utilization of one or more of CPU, memory, or storage of the one or more server nodes hosting the second stateful service.

11. The method of claim 10, the second scaling action being determined when the utilization of one or more of CPU, memory, or storage satisfies a minimum criteria or a maximum criteria indicated by the threshold processing capacity.

12. The method of claim 1, the second scaling action being determined when the utilization of one or more of CPU, memory, or storage of the one or more server nodes hosting the second stateful service associated with a threshold number of the plurality of server nodes hosting the second stateful service satisfies a utilization threshold.

13. The method of claim 1, both the first scaling action and the second scaling action being determined further based on a time of day or a time of week.

14. An apparatus comprising:
one or more non-transitory computer-readable storage media comprising instructions which,
when executed by one or more processors of a cluster manager computer that is communicatively coupled to a plurality of server nodes, each of the server nodes being configured to host one of a plurality of different stateful services, the cluster manager computer being programmed to invoke scaling operations of the server nodes in real-time as the server nodes operate, each of the different stateful services being programmed to implement a different instance of a plurality of scaling service functions,
cause the one or more processors to be capable of performing operations comprising:
calling a first instance of a scaling status function among the plurality of scaling service functions of a first stateful service and receiving a first scaling action indicating a change in scaling for one or more of the plurality of server nodes hosting the first stateful service, the first scaling action being determined based on first capacity data indicating a then-current processing capacity and a threshold processing capacity of the one or more server nodes hosting the first stateful service;
calling a second instance of a scaling status function among the plurality of scaling service functions of a second stateful service and receiving a second scaling action indicating a change in scaling for one or more of the plurality of server nodes hosting the second stateful service, the second scaling action being determined based on second capacity data indicating a then-current processing capacity and a threshold processing capacity of the one or more server nodes hosting the second stateful service, the second instance of the state transfer function having a different implementation in computer program code than the first instance of the state transfer function;
based on the first scaling action, calling a first instance of a state transfer function among the plurality of scaling service functions of the first stateful service for transfer of stateful data between two or more of the plurality of server nodes;
based on the second scaling action, calling a second instance of a state transfer function among the plurality of scaling service functions of the second stateful service for transfer of stateful data between two or more of the plurality of server nodes.

15. The apparatus of claim 14, a unit of measurement associated with the first capacity data being different from a unit of measurement associated with the second capacity data.

16. A system comprising:
one or more processors of a cluster manager computer that is communicatively coupled to a plurality of server nodes, each of the server nodes being configured to host one of a plurality of different stateful services, the cluster manager computer being programmed to invoke scaling operations of the server nodes in real-time as the server nodes operate, each of the different stateful services being programmed to implement a different instance of a plurality of scaling service functions;
one or more non-transitory storage media storing instructions which, when executed by the one or more processors, cause the one or more processors to be capable of:
calling a first instance of a scaling status function among the plurality of scaling service functions of a first stateful service and receiving a first scaling action indicating a change in scaling for one or more of the plurality of server nodes hosting the first stateful service, the first scaling action being determined based on first capacity data indicating a then-current processing capacity and a threshold processing capacity of the one or more server nodes hosting the first stateful service;
calling a second instance of a scaling status function among the plurality of scaling service functions of a second stateful service and receiving a second scaling action indicating a change in scaling for one or more of the plurality of server nodes hosting the second stateful service, the second scaling action being determined based on second capacity data indicating a then-current processing capacity and a threshold processing capacity of the one or more server nodes hosting the second stateful service, the second instance of the state transfer function having a different implementation in computer program code than the first instance of the state transfer function;
based on the first scaling action, calling a first instance of a state transfer function among the plurality of scaling service functions of the first stateful service for transfer of stateful data between two or more of the plurality of server nodes;
based on the second scaling action, calling a second instance of a state transfer function among the plurality of scaling service functions of the second stateful service for transfer of stateful data between two or more of the plurality of server nodes.

17. The system of claim 16, a unit of measurement associated with the first capacity data being different from a unit of measurement associated with the second capacity data.

* * * * *